(12) United States Patent
Doherty et al.

(10) Patent No.: US 7,388,149 B2
(45) Date of Patent: Jun. 17, 2008

(54) COUPLING FOR CORRUGATED CABLE CONDUITS FOR ENCLOSING CABLES

(75) Inventors: Robert Doherty, Eatons Neck, NY (US); Jerry Santillo, Babylon, NY (US); John O'Shea, Malvern, PA (US)

(73) Assignee: Creative Bath Products, Inc., Central Islip, NY (US)

( * ) Notice: Subject to any disclaimer, the term of this patent is extended or adjusted under 35 U.S.C. 154(b) by 435 days.

(21) Appl. No.: 11/121,287

(22) Filed: May 3, 2005

(65) Prior Publication Data

US 2005/0272264 A1 Dec. 8, 2005

Related U.S. Application Data

(60) Provisional application No. 60/567,901, filed on May 3, 2004.

(51) Int. Cl.
*H02G 15/08* (2006.01)

(52) U.S. Cl. .................................... 174/21 JS

(58) Field of Classification Search ............. 174/21 JS, 174/481; 285/419, 903, 921, 481
See application file for complete search history.

(56) References Cited

U.S. PATENT DOCUMENTS 5,072,972 A * 12/1991 Justice ..................... 285/373
5,277,459 A * 1/1994 Braun et al. .............. 285/419
2004/0154817 A1* 8/2004 Sudo et al. ................. 174/49

FOREIGN PATENT DOCUMENTS

JP 07-322448 * 12/1995

* cited by examiner

*Primary Examiner*—Chau N Nguyen
(74) *Attorney, Agent, or Firm*—Gerald E. Hespos; Anthony J. Casella

(57) ABSTRACT

A coupling is provided for corrugated conduits. The coupling is formed unitarily from a resin material and has first and second coupling halves that are joined unitarily along a living hinged. The halves can be rotated about the living hinge from an open position to a closed position. Ends of corrugated conduits can be engaged between the coupling halves when the coupling halves are in the closed position. Edges of the coupling halves opposite the hinge have locking structures for holding the halves in the closed position.

12 Claims, 4 Drawing Sheets

COUPLING FOR CORRUGATED CABLE CONDUITS FOR ENCLOSING CABLES

This application claims priority to an application entitled "COUPLING FOR CORRUGATED CABLE CONDUITS FOR ENCLOSING CABLES BRANCHED OR SPLICED FROM A TRUNK CABLE ASSEMBLY" filed in the United States Patent and Trademark Office on May 3, 2004 and assigned Ser. No. 60/567,901, the contents of which are hereby incorporated by reference.

BACKGROUND OF THE INVENTION

1. Field of the Invention

The invention relates to a coupler for corrugated conduits.

2. Description of the Related Art

Many large residential, commercial and office buildings are provided with complex arrays of telecommunication cables. An array of parallel cables is likely to extend from a main junction box in a building and will traverse interior walls, ceilings and/or floors of the building to specified locations where the cables can be accessed. Small trunks of cables are likely to be branched or spliced from a main trunk of cables to direct the smaller trunk of cables towards a particular floor of a building or a particular area on a floor. Individual cables then may be branched or spliced from the small trunks of cables.

Cables often must be bent to accommodate required changes of direction. However, very abrupt bends of a cable can create stresses on the outer curvature of the bend. Such stresses can stretch and damage the insulation coating on the outside of a cable and can damage the shielding layers provided on many cables. Corrugated conduits protect cables and help to ensure smooth bends. Plastic corrugated conduits can be manufactured inexpensively and provide a very good strength-to-weight ratio. Additionally corrugated conduits exhibit sufficient flexibility to facilitate both storage, transportation and installation. Couplers are available for joining corrugated conduits in end-to-end relationship. Examples of such couplers are shown, for example, in U.S. Pat. Nos. 4,168,091, 4,273,367, 4,443,031, 4,647,074, 4,795,197, 5,015,013, 5,458,380, 6,145,896, 6,398,270 and 6,595,473.

Corrugated conduits are not well suited to the branching or splicing that often is required for telecommunication cables. As a result, installers often use hand tools, such as cutting pliers, snips or knives to make a hole in a corrugated conduit. The required number of telecommunication cables then are directed from the main trunk and through the hole. The hole formed in a corrugated tube in this manner typically provides a sharp edge that can damage the cable. Additionally, an installer is likely to bend the branched cable or cables sharply at the hole, thereby creating stresses and strains, particularly along the outer edge of the bend. The branched cables may be passed through another conduit. However, there often is a space between the conduit for the main trunk of cables and the conduit for the branched cables. Regions of the branched cables between the hole in the main conduit and the end of the branch conduit are exposed and may be subject to damage. Additionally, the process of cutting a hole in the side of a conduit is labor intensive, time consuming and creates the potential for damaging cables during the cutting process.

Connectors are available for more than two opposed corrugated tubes. For example, U.S. Pat. No. 5,046,766 shows a connector for two corrugated tubes disposed in axially aligned and end-to-end relationship and one corrugated tube that extends at a right angle to the aligned tubes. This connector, however, requires the cables to be bent at a sharp right angle through the connector. As explained above, a sharp right angle bend generally is not desired. U.S. Pat. No. 5,272,459 shows a Y-connector that permits two corrugated tubes to extend from the wall of a junction box or the like. The Y-shaped coupler has two separate halves that can be placed over one another and around the two corrugated tubes. A non-corrugated portion of the coupler then is passed through an aperture in the wall and is secured to the wall by a nut or similar fixturing device.

It is an object of the subject invention to provide a coupler that enables a corrugated tube to be branched efficiently from axially aligned corrugated tubes.

It is another object of the subject invention to provide a coupler that can be molded efficiently and that reduces the assembly of parts required at the installation site.

SUMMARY OF THE INVENTION

A coupling is provided for corrugated conduits. A coupling in accordance with the invention is formed from a resin material and includes opposed first and second coupling halves that are joined unitarily along a living hinge. The halves can be rotated about the living hinge from an open position to a closed position. Ends of corrugated conduits can be positioned on one of the coupling halves when the coupling halves are in the open position. Alternatively, the coupling halves can be engaged securely around the corrugated conduits when the coupling halves are rotated about the hinge into the second position.

Portions of the coupling opposite the living hinge include a locking structure with a ridge on the first half of the coupling and with a latch on the second half of the coupling. The ridge and the latch each may extend substantially the entire length of the coupling. The coupling may have a groove formed on one of the first and second halves of the coupling and a rib may be formed on the other of the first and second halves of the coupling at locations spaced inwardly from the living hinge. The groove and the rib are dimensioned, disposed and configured to nest with one another as the coupling is rotated into the closed condition. Interior portions of the first and second halves of the coupling are formed with grooves and ribs dimensioned to nest with the grooves and ribs defined by the corrugated conduit.

A continuous tubular section may be formed at one end of the coupling. The continuous tubular section may be formed unitarily with one half of the coupling, but preferably is not connected directly to the opposed half of the coupling. The continuous tubular section may include an array of external threads extending from the end of the coupling and a flange may be formed at the inward end of the array of threads. The external threads may be configured for threaded engagement with a nut. Thus, this embodiment can be employed for connecting a corrugated conduit to a junction box, a panel or the like.

The coupling may include a downstream main trunk coupling, an upstream main trunk coupling and a branch coupling. The upstream and downstream main trunk couplings preferably are aligned along a common axis. The branch coupling preferably is aligned to the axis of the upstream and downstream main trunk couplings at an acute angle, and preferably an angle of approximately 30°.

Sides of the downstream main trunk coupling diametrically opposite the living hinge are formed with interengageable latch structures for holding the first and second halves of the coupling in the closed condition. The latch structures preferably include a latching ridge that extends substantially continuously along the first half at a location diametrically opposite the living hinge and at least one locking claw that extends along the edge of the second half of the coupling opposite the hinge. The claw is configured to engage the ridge as the first and second halves of the coupling are rotated into the closed position. Thus, the claw will resiliently deflect out and over the ridge. However, the claw will return resiliently toward an undeflected condition to engage the ridge when the first and second halves of the coupling reach the closed position.

Sides of the branch coupling opposite the living hinge of the coupling also are formed with a ridge and latch similar to the above-described ridge and latch formed on the downstream main trunk coupling. The latch preferably is an elongate latch that extends along at least a major portion of the branch trunk coupling. The ridge preferably extends along a comparable distance. In a preferred embodiment, the ridge extends along the entire length of the branch coupling and further extends continuously onto the downstream branch coupling.

A locking structure also is provided on the upstream main trunk coupling at a location diametrically opposite the living hinge. The locking structure on the upstream main trunk coupling may be a ridge and latch similar to the above-described ridge and latch structures on the downstream main trunk coupling and on the branch coupling.

The side of the branch coupling diametrically opposite the locking structure thereof may include alignment members for aligning the edges of the branch coupling opposite the locking structure. The alignment structures may include ribs and grooves that interengage when the first and second halves of the coupling are rotated into the closed position.

DETAILED DESCRIPTION OF THE PREFERRED EMBODIMENTS

Figure 1:
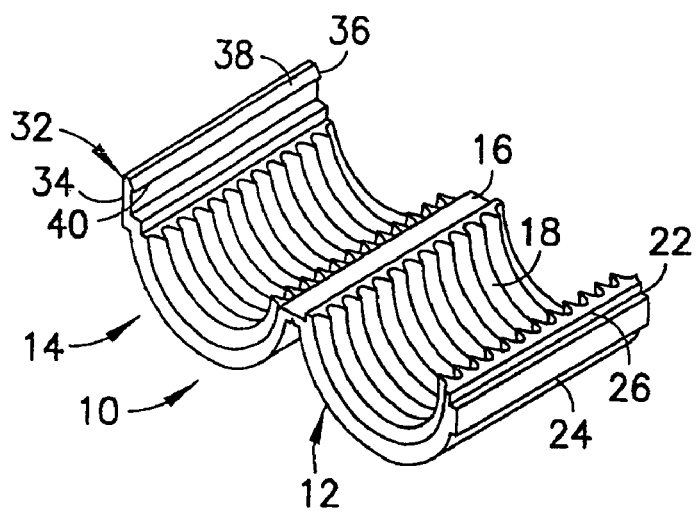
FIG. 1 is a perspective view of a coupling in accordance with a first embodiment of the invention.
Figure 2:
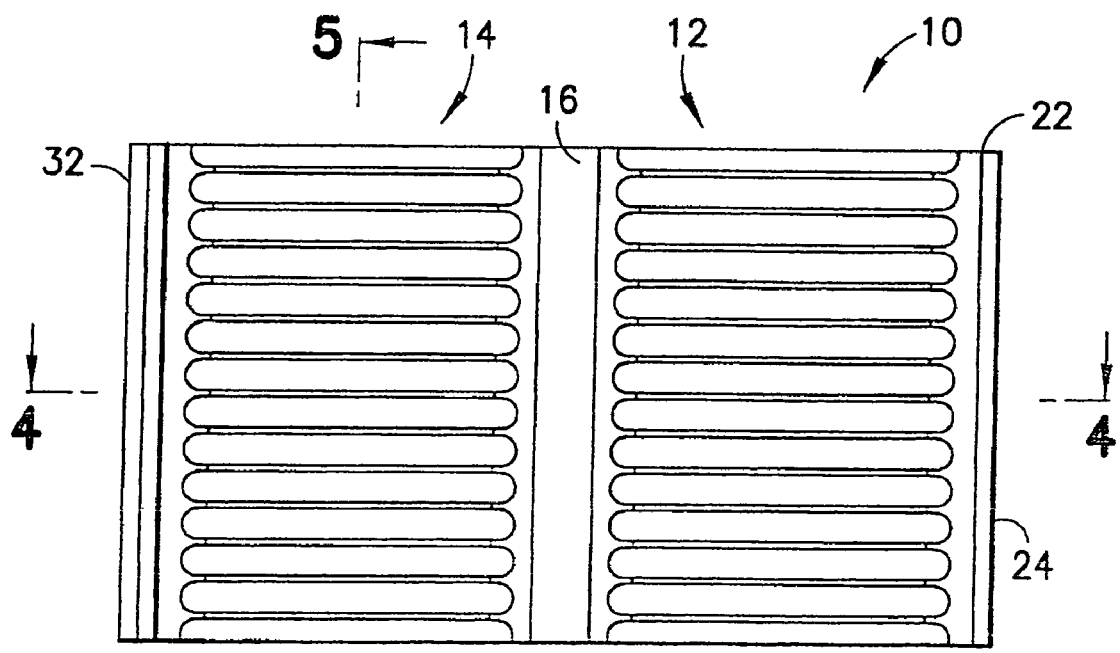
FIG. 2 is a top plan view of the coupling shown in FIG. 1.
Figure 3:
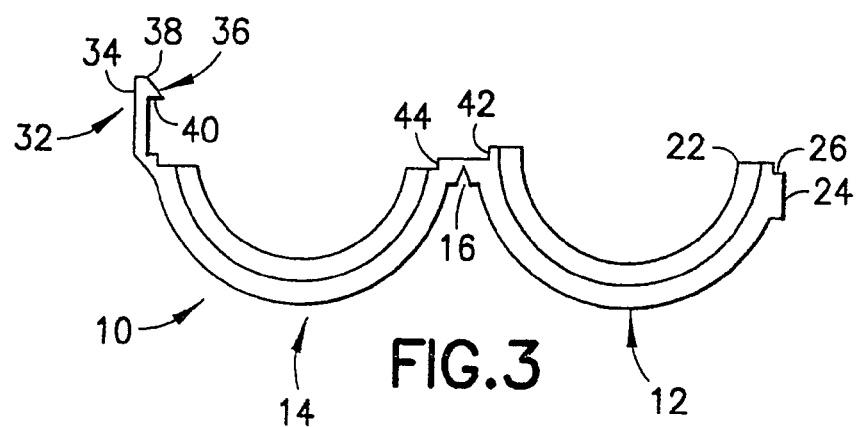
FIG. 3 is an end elevational view of the coupling shown in FIGS. 1 and 2.
Figure 4:
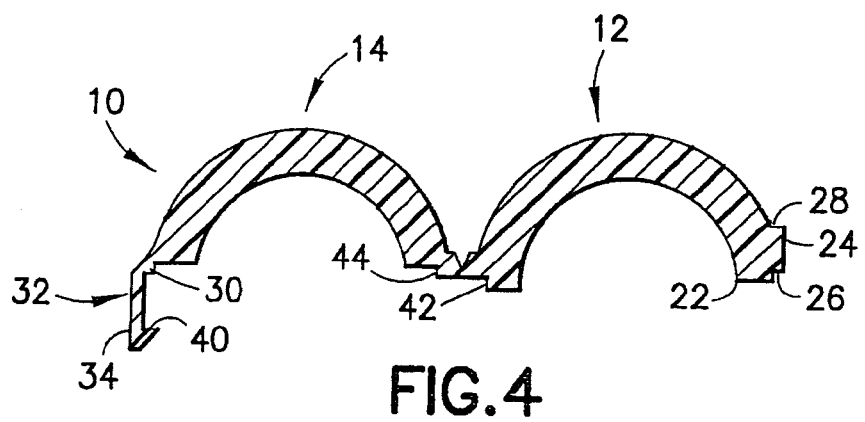
FIG. 4 is a cross-sectional view taken along line 4-4 in FIG. 2.
Figure 5:
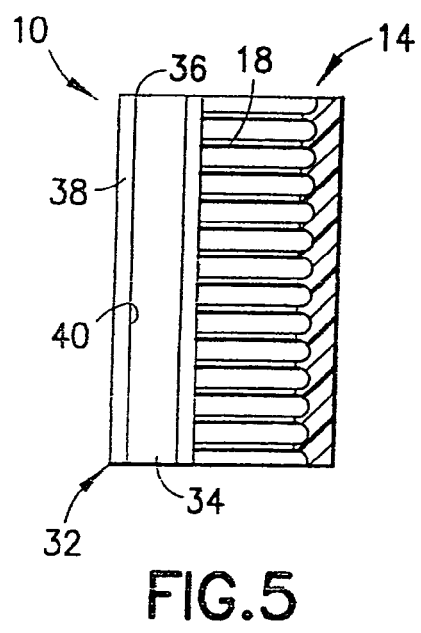
FIG. 5 is a cross-sectional view taken along line 5-5 in FIG. 2.

A coupling in accordance with a first embodiment of the invention is identified generally by the numeral 10 in FIGS. 1-5. The coupling 10 is molded unitarily from a resin material and includes first and second semi-cylindrical halves 12 and 14 that are joined unitarily to one another by a living hinge 16. Each half includes an inner semi-cylindrical surface characterized by an array of corrugations 18 configured to nest with grooves and ridges formed on the outer circumferential surface of the corrugated conduit with which the coupling 10 is to be connected.

The first semi-cylindrical half 12 of the coupling 10 includes a free edge 22 substantially diametrically opposite the hinge 16. A locking ridge 24 is formed on the outer circumferential surface of the first cylindrical half 12 at a location spaced slightly from the free edge 22. The locking ridge 24 projects out from the outer circumferential surface of the first semi-cylindrical half 12 and extends substantially completely along the length of the first semi-cylindrical half 12. The locking ridge 24 defines a substantially right angle positioning step 26 along the longitudinal side of the locking ridge 24 closer to the free edge 22 and a substantially right angle locking step 28 on the side of the locking ridge 24 opposite the positioning step 26.

The second half 14 includes a second positioning step 30 facing inwardly thereon at a location near the ends of the corrugations 18 furthest from the hinge 16. The second positioning step 30 is dimensioned and disposed to nest with the first positioning step 26 defined by the locking ridge 24 on the first half 12. This interengagement of the first and second positioning steps 26 and 30 substantially prevents the free edge 22 of the first half 12 from deflecting outwardly when the coupling 10 is in the closed position.

The second half 14 further includes an elongate latch 32 projecting substantially tangentially from the second positioning step 30. The elongate latch 32 includes a deflectable panel 34 defining a substantially tangentially aligned plane and an inwardly projecting pawl 36. The inwardly projecting pawl 36 includes a slanted deflection generating surface 38 at the free end of the latch 32 and a locking edge 40 that is aligned substantially perpendicularly to the plane of the panel 34.

Portions of the first half 12 adjacent the hinge 16 include an outwardly facing notch 42 extending the entire length of the first half 12. Portions of the second half 14 adjacent the hinge 16 include an inwardly facing notch 44 extending the entire length thereof. The notches 42 and 44 are dimensioned and configured to nest with one another when the first and second halves 12 and 14 are rotated into the closed position.

The coupling 10 may be used by positioning first and second corrugated tubes (not shown) in the first half 12 so that the corrugations of the tube nest with the corrugations 18 in the first half 12. The second half 14 then is rotated about the hinge 16 and towards the closed position. The slanted surface 38 of the pawl 36 will engage the ridge 24. This engagement will cause the panel 34 to deflect outwardly, thereby permitting the pawl 36 to ride over the ridge 24 as the coupling 10 is moved towards the closed position. Sufficient movement of the coupling 10 towards the closed position will permit the locking edge 40 of the pawl 36 to align with the locking edge 28 of the locking ridge 24. As a result, the panel 34 will return resiliently towards an undeflected condition so that the locking edge 40 of the pawl 36 will snap into engagement with the locking step 28 of the locking ridge 24. In this position, the elongate grooves 42 and 44 at locations on the first and second halves 12 and 14 adjacent the hinge 16 will nest with one another. Additionally, the positioning steps 22 and 30 will nest with one another to prevent an outward deflection of the first half 12 that could disengage the latch 32 from the locking ridge 24. Hence, the coupling 10 is held securely in the closed position around the two corrugated tubes.

Figure 6:
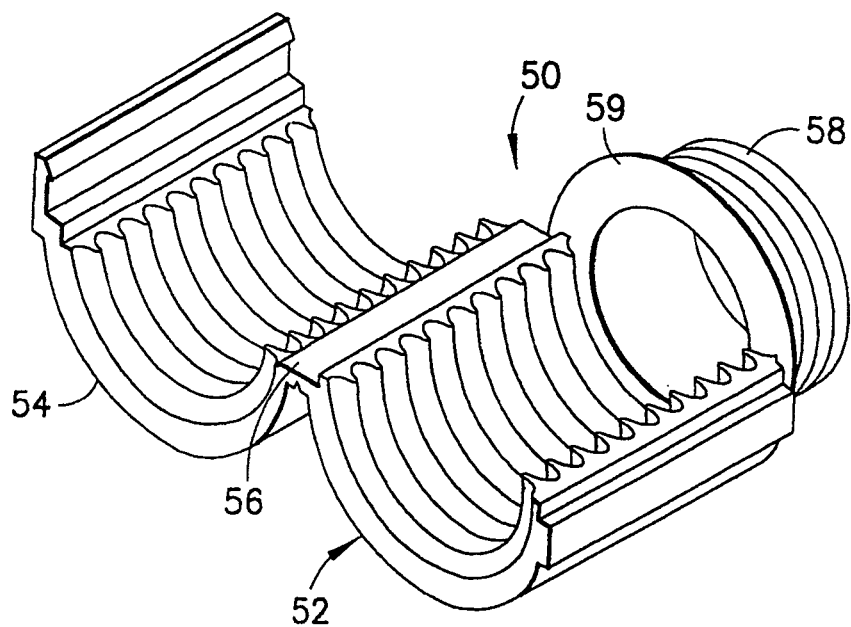
FIG. 6 is a perspective view of an alternate embodiment of the coupling.

FIG. 6 shows a variation of the coupling 10 described above and illustrated in FIGS. 1-5. In particular, FIG. 6 shows a coupling 50 with a first half 52 and a second half 54 that are joined unitarily to one another by a hinge 56. First and second halves 52 and 54 are structurally and functionally very similar to the first and second halves 12 and 14 described above with respect to the first embodiment. However, the first half 52 further is formed with a continuous substantially cylindrical nipple 58 at one longitudinal end thereof. The nipple 58 has an array of external threads and a flange 59. The coupling 50 is employed by positioning a single corrugated tube (not shown) in the first half 52 so that the corrugated tube extends away from the nipple 58. The second half 54 then is rotated about the hinge 56 and is locked to the first half 52 substantially as described above with respect to the coupling 10 illustrated in FIGS. 1-5. The coupling 50 then can be used by inserting the threaded nipple 58 through an aperture, such as the aperture in a panel, wall or junction box. A nut (not shown) then can be threaded onto the threads of the nipple 58 so that the coupling 50 is held securely in position with the corrugated tube extending therefrom.

Figure 7:
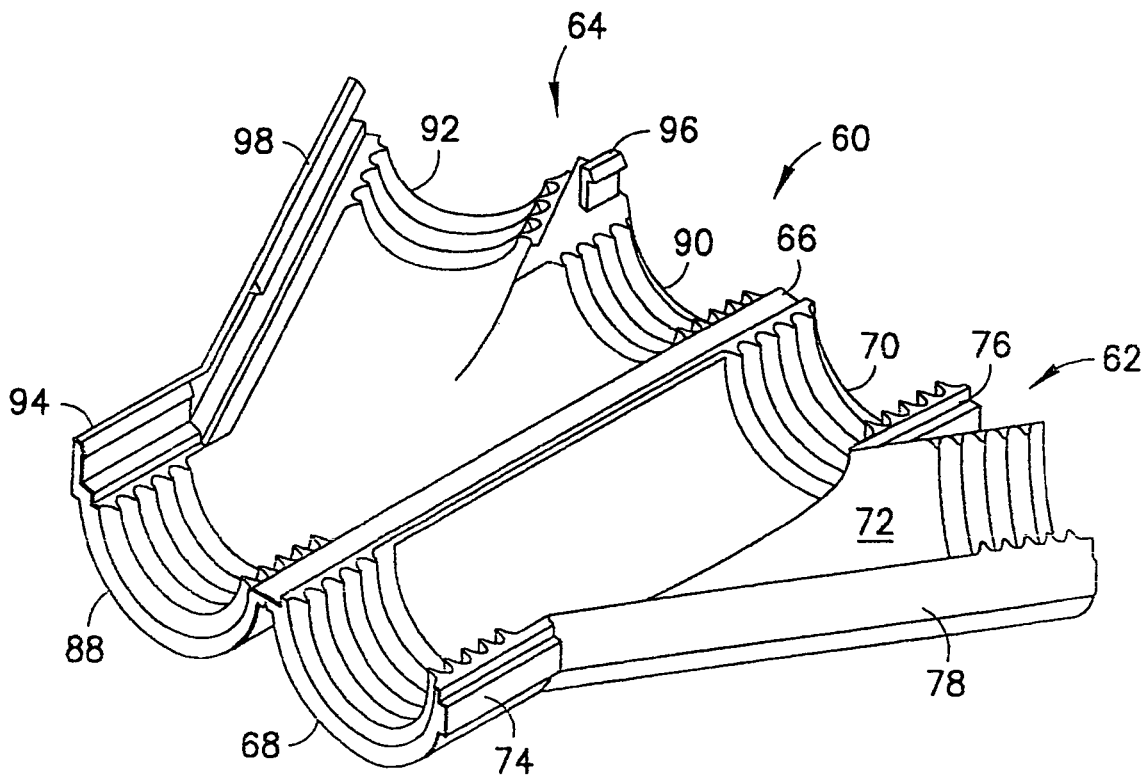
FIG. 7 is a perspective view of a further embodiment of the invention.
Figure 8:
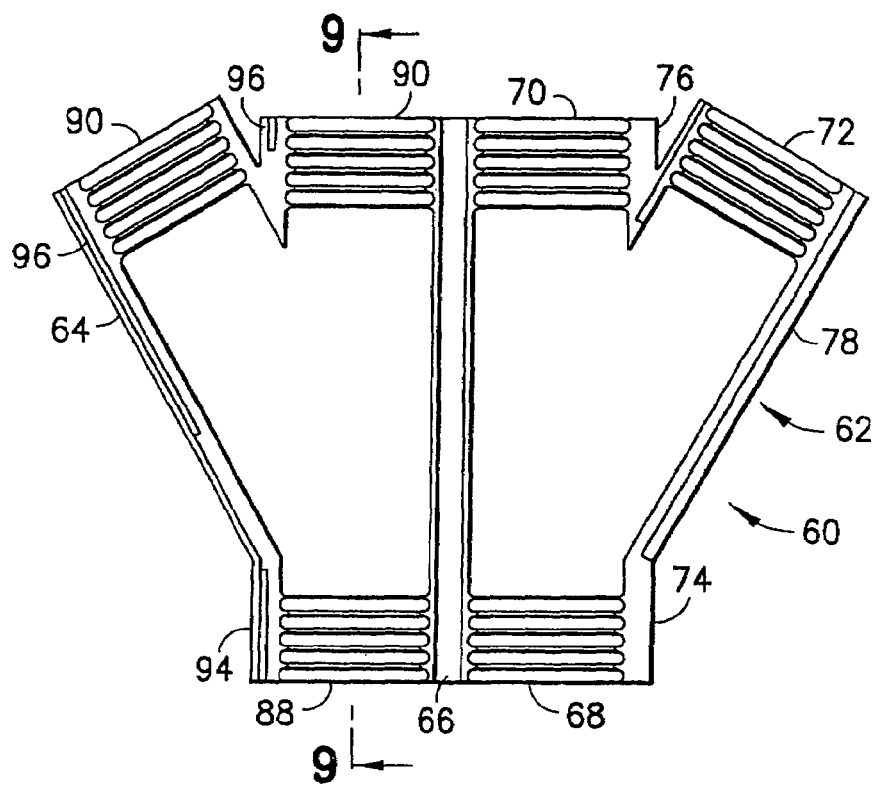
FIG. 8 is a top plan view of the coupling shown in FIG. 7.
Figure 9:
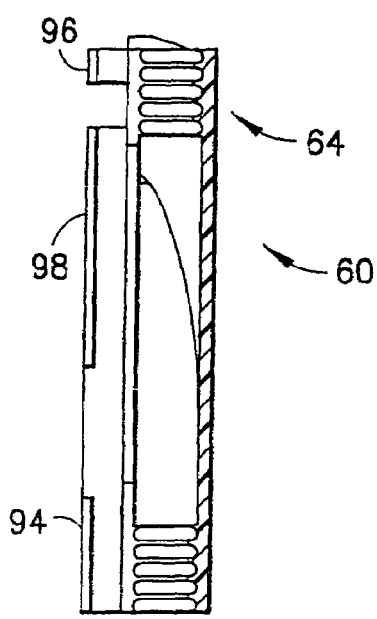
FIG. 9 is a cross-sectional view taken along line 9-9 in FIG. 8.

A coupling in accordance with a third embodiment of the invention is identified generally by the numeral 60 in FIGS. 7-9. The coupling 60 includes first and second halves 62 and 64 that are joined unitarily to one another by a hinge 66.

The first half 62 includes a first upstream main trunk connector 68, a first downstream main trunk connector 70 and a first branch connector 72. The first upstream and downstream main trunk connectors 68 and 70 are aligned along a common axis. The first branch connector 72 is aligned along an axis that defines an angle of about 30° to the axis defined by the first upstream and downstream main trunk connectors 68 and 70. Thus, the first half 62 effectively defines a Y-shape. Interior portions of the first half 62 near the first upstream and downstream main trunk connectors 68 and 70 and the first branch trunk connector 72 are formed with arrays of corrugations configured and dimensioned to nest with corrugations on the corrugated tubes that are to be coupled. Outer surface regions of the first half along sides opposite the hinge 66 include locking ridges structurally and functionally comparable to the locking ridge 24 on the coupling 10 of the first embodiment. More particularly, the first downstream main trunk connector 68 includes a first downstream locking ridge 74 diametrically opposite the hinge 66. The first upstream main trunk connector 70 includes a locking ridge 76 diametrically opposite the hinge 66. Additionally, the first branch connector 72 includes a locking ridge 78 that extends substantially continuously from the locking ridge 74 along the entire length of the first branch connector 72.

Positioning steps are defined substantially adjacent the locking ridges 74-78 and have configurations and functions similar to the positioning step 22 on the first half 12 of the coupling 10 described above and illustrated in FIGS. 1-5. Additionally, portions of the first half 62 substantially adjacent the hinge 66 include a positioning groove substantially identical to the positioning groove on the coupling 10.

The second half 64 of the coupling 60 is in many respects a mirror image of the first half 62. In particular, the second half 64 includes a second upstream main trunk connector 88, a second downstream main trunk connector 90 and a second branch connector 92. Additionally, the second half 64 includes latches 94, 96 and 98 that will releasably engage the locking ridges 74, 76 and 78 respectively. The latches 94, 96 and 98 are structurally and functionally similar to the latch 30 described and illustrated with respect to the first embodiment. Additionally, the second half 64 includes a positioning step inwardly from the respective latches 94-98 that will engage the corresponding positioning step on the first half in a manner substantially as described with respect to the first embodiment.

The coupling 60 is employed by positioning a first conduit (not shown) in the first upstream main trunk connector 68 so that the corrugations of the conduit nest with the corrugations in the first half. Wires or cables are directed through the conduit in a conventional manner. At least one of the cables is branched from the main trunk, while other of the cables continue in a substantially linear manner. A main trunk of cables is threaded through a second conduit, and an end of the second conduit is positioned in the first downstream connector 70 so that the corrugations of the downstream conduit nest with the corrugations in the first downstream main trunk connector 70. The branch cables then are directed through a branch conduit, and an end of the branch conduit is placed in the first branch connector 72. The branch conduit, therefore, is positioned in an alignment to avoid a sharp bend in any of the cables or wires that could create stresses or strains. The second half 64 then is rotated about the hinge 66 and towards a closed position. This rotation of the second half 64 will cause the latches 94-98 to engage and releasably lock with the locking ridges 74-78. Additionally, the positioning steps will nest with one another to prevent any significant outward deflection of free edges of the first or second halves 62 or 64 that could permit the coupling 60 to open.

What is claimed is:

1. A coupling for joining at least one corrugated tube to another structure, said coupling having first and second coupling halves, said coupling halves having opposite first and second longitudinal ends, concave inner surfaces opposed to one another and convex outer surfaces opposite the inner surfaces, the concave inner surfaces of said first and second coupling halves being formed with ridges and grooves configured for nesting with corrugations of the corrugated tube, each of said coupling halves further having a hinged edge joined unitarily to a living hinge extending continuously between the first and second longitudinal ends of the coupling halves, each of said coupling halves further having a locking edge substantially diametrically opposite the hinged edges and extending continuously between the first and second longitudinal ends, said coupling halves being rotatable about said living hinged from a closed position where said locking edges abut and an open position where said locking edges are on opposite respective sides of said living hinge, a locking ridge being formed on the convex outer surface of the first coupling half in proximity the locking edge thereof, the locking ridge extending continuously between the first and second longitudinal ends of the first coupling half and having a locking step facing away from the second coupling half when the first and second coupling halves are in the closed condition, and an elongate latch projecting from the locking edge of the second coupling half and extending continuously between the first and second longitudinal ends of the second coupling half, the latch including an elongate pawl configured for snapped engagement with the locking step on the first coupling half when the first and second coupling halves are in the closed condition, wherein the pawl has a deflection generating surface defining a plane aligned at an acute angle to a diametric plane connecting the hinged and locking edges of the first and second coupling halves, the locking pawl further including a locking edge aligned for substantially face-to-face engagement with the locking step on the locking ridge of the first coupling half.

2. The coupling of claim 1, wherein the locking edges of the first and second coupling halves are formed with positioning steps configured for nested engagement with one another when the first and second coupling halves are in the closed condition for positioning the locking edges so that the locking ridge and the latch align for proper locked engagement with one another.

3. The coupling of claim 2, wherein the hinged edges of first and second coupling halves are formed with ridges and notches extending continuously therealong and nesting with one another when said first and second couplings halves are in the closed condition for ensuring edge to edge alignment of the hinge edges.

4. A coupling for joining at least one corrugated tube to another structure, said coupling having first and second coupling halves, said coupling halves having opposite first and second longitudinal ends, concave inner surfaces opposed to one another and convex outer surfaces opposite the inner surfaces, the concave inner surfaces of said first and second coupling halves being formed with ridges and grooves configured for nesting with corrugations of the corrugated tube, each of said coupling halves further having a hinged edge joined unitarily to a living hinge extending continuously between the first and second longitudinal ends of the coupling halves, each of said coupling halves further having a locking edge substantially diametrically opposite the hinged edges and extending continuously between the first and second longitudinal ends, said coupling halves being rotatable about said living hinged from a closed position where said locking edges abut and an open position where said locking edges are on opposite respective sides of said living hinge, a locking ridge being formed on the convex outer surface of the first coupling half in proximity the locking edge thereof, the locking ridge extending continuously between the first and second longitudinal ends of the first coupling half and having a locking step facing away from the second coupling half when the first and second coupling halves are in the closed condition, and an elongate latch projecting from the locking edge of the second coupling half and extending continuously between the first and second longitudinal ends of the second coupling half, the latch including an elongate pawl configured for snapped engagement with the locking step on the first coupling half when the first and second coupling halves are in the closed condition, and a continuous tubular nipple form on the first longitudinal end of the first coupling half and configured for aligning with the first longitudinal end of the second coupling halves when the first and second coupling halves are in the closed condition.

5. The coupling of claim 4, wherein the pawl has a deflection generating surface defining a plane align at an acute angle to a diametric plane connecting the hinged and locking edges of the first and second coupling halves, the locking pawl further including a locking edge aligned for substantially face-to-face engagement with the locking step on the locking ridge of the first coupling half.

6. The coupling of claim 4, wherein the nipple includes an annular flange adjacent the first and second coupling halves and an externally threaded tubular member extending from the flange substantially concentric with the first and second coupling halves when the first and second coupling halves are in the closed condition.

7. A coupling for joining at least one corrugated tube to another structure, said coupling having first and second coupling halves, said coupling halves having opposite first and second longitudinal ends, concave inner surfaces opposed to one another and convex outer surfaces opposite the inner surfaces, each of said coupling halves further having a hinged edge joined unitarily to a living hinge extending continuously between the first and second longitudinal ends of the coupling halves, each of said coupling halves further having a locking edge substantially diametrically opposite the hinged edges and extending continuously between the first and second longitudinal ends, said coupling halves being rotatable about said living hinged from a closed position where said locking edges abut and an open position where said locking edges are on opposite respective sides of said living hinge, a locking ridge being formed on the convex outer surface of the first coupling half in proximity the locking edge thereof, the locking ridge extending continuously between the first and second longitudinal ends of the first coupling half and having a locking step facing away from the second coupling half when the first and second coupling halves are in the closed condition, and an elongate latch projecting from the locking edge of the second coupling half and extending continuously between the first and second longitudinal ends of the second coupling half, the latch including an elongate pawl configured for snapped engagement with the locking step on the first coupling half when the first and second coupling halves are in the closed condition, wherein the first and second coupling halves are formed respectively with first and second branch coupling halves intersecting the locking edges and being registered with one another to define a branch coupling when the first and second coupling halves are in the closed condition.

8. The coupling of claim 7, wherein the concave inner surfaces of said first and second coupling halves are formed with ridges and grooves configured for nesting with corrugations of the corrugated tube.

9. The coupling of claim 7, wherein the first branch coupling half is formed with a locking ridge extending along an edge thereof most distant from the living hinge, and wherein the second branch coupling half has an elongate latch projecting from an edge of the second branch coupling half most distant from the living hinged.

10. The coupling of claim 9, wherein the locking ridge of the first branch coupling half extends continuously to one of said longitudinal ends of the first coupling half.

11. A coupling for joining at least one corrugated tube to another structure, said coupling having first and second coupling halves, said coupling halves having opposite first and second longitudinal ends, concave inner surfaces opposed to one another and convex outer surfaces opposite the inner surfaces, each of said coupling halves further having a hinged edge joined unitarily to a living hinge extending continuously between the first and second longitudinal ends of the coupling halves, each of said coupling halves further having a locking edge substantially diametrically opposite the hinged edges and extending continuously between the first and second longitudinal ends, said coupling halves being rotatable about said living hinged from a closed position where said locking edges abut and an open position where said locking edges are on opposite respective sides of said living hinge, a locking ridge being formed on the convex outer surface of the first coupling half in proximity the locking edge thereof, the locking ridge extending continuously between the first and second longitudinal ends of the first coupling half and having a locking step facing away from the second coupling half when the first and second coupling halves are in the closed condition, and an elongate latch projecting from the locking edge of the second coupling half and extending continuously between the first and second longitudinal ends of the second coupling half, the latch including an elongate pawl configured for snapped engagement with the locking step on the first coupling half when the first and second coupling halves are in the closed condition, wherein portions of the coupling adjacent the first longitudinal end defines an upstream main trunk coupling and wherein a portion of the coupling adjacent the second longitudinal end defines a downstream main trunk coupling, the upstream and downstream main trunk couplings being substantially aligned along a longitudinal axis, the coupling further including a branch coupling intersecting the locking edges of the first and second coupling halves and having a longitudinal axis aligned at an acute angle to the longitudinal axis defined by the upstream and downstream main trunk couplings, the branch coupling being defined by first and second branch coupling halves formed unitarily with the respective first and second coupling halves and being registered with one another when the first and second coupling halves are in the closed condition.

12. The coupling of claim 11, wherein the first branch coupling half includes an elongate locking ridge and the second branch coupling half includes a latch for engaging the locking ridge of the first branch coupling half when the first and second coupling halves are in the closed condition.

* * * * *